United States Patent Office 2,720,112
Patented Oct. 11, 1955

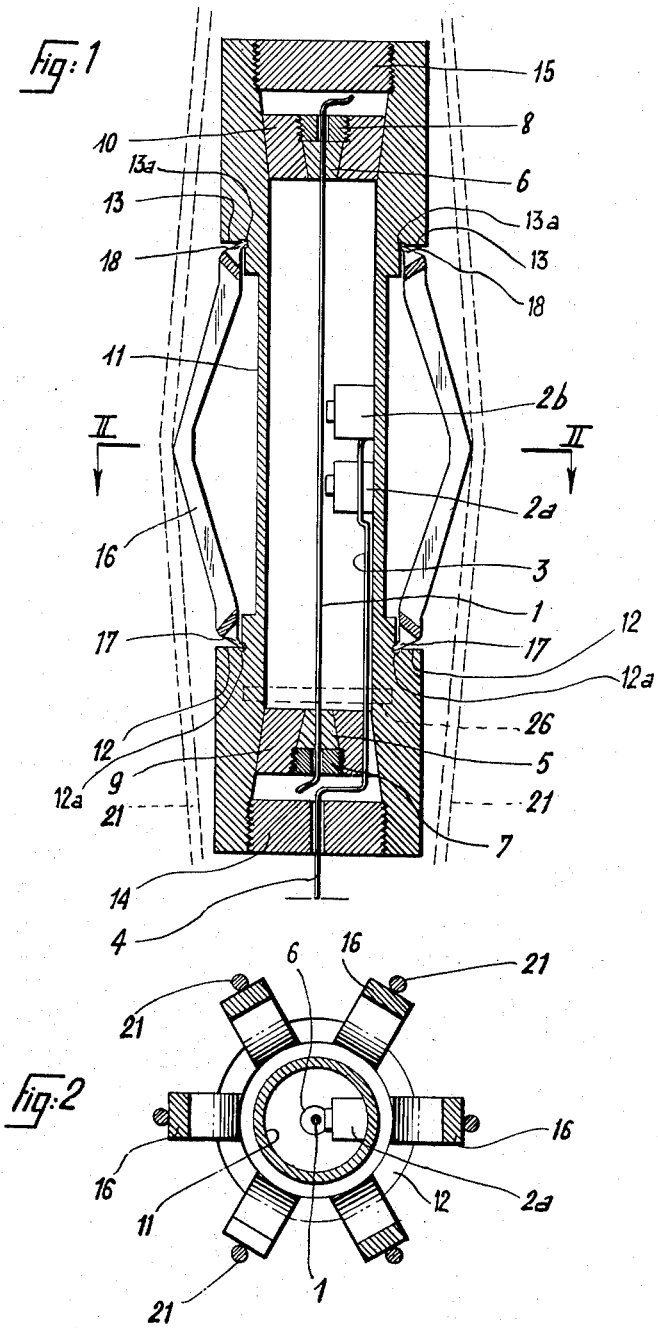

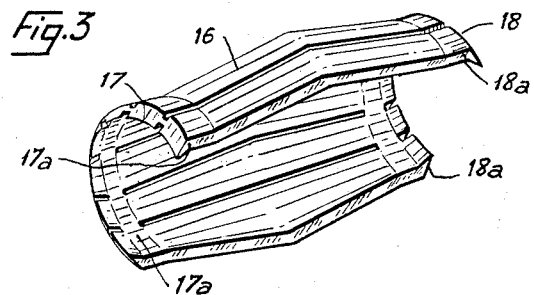
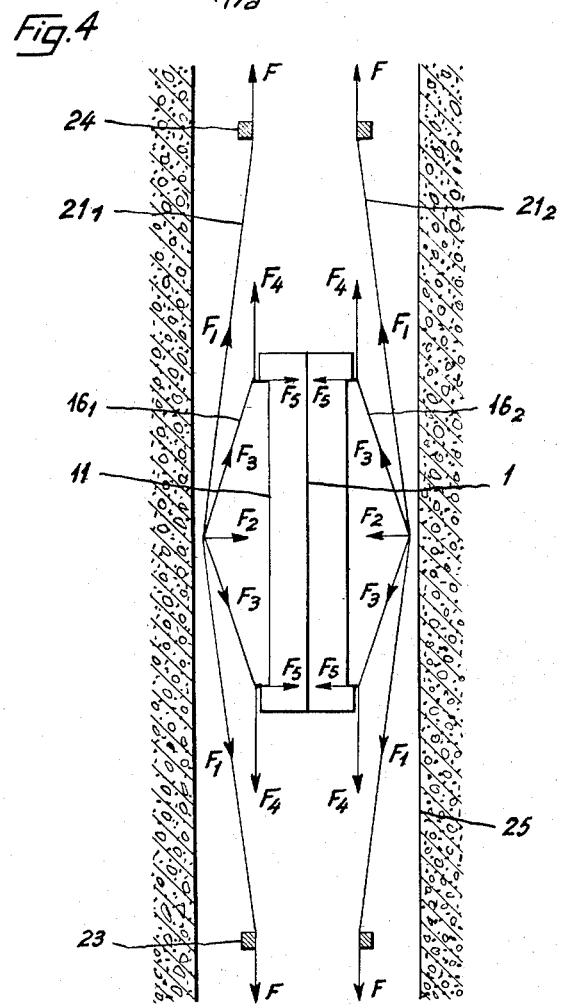

2,720,112
DEVICE FOR MEASURING THE TENSION OF WIRES

André Coyne and Jean Bellier, Paris, France

Application October 13, 1952, Serial No. 314,532

Claims priority, application France July 16, 1952

10 Claims. (Cl. 73—144)

The present invention relates to tension measuring devices designed for use in connection with prestressed concrete.

An object of this invention is to provide a device allowing accurate measurement of the tension of the reinforcement wires in the concrete structure, whenever desired.

Another object of this invention is to provide such a device which is designed to remain embedded within the concrete structure and to supply the required readings at a remote external point, the accuracy and sensitiveness of the device being substantially unaffected by its stay within the structure.

A further object of this invention is to provide a tension measuring device which is of simple and tough construction and which can successfully withstand rough-handling, bad weather and other detrimental conditions.

A still further object of this invention is to provide a device of the kind set forth, operating with a vibrating cord or string, the tension of which is made appendant to that of the reinforcement wires, the vibration frequency of this cord or string being electrically measured.

Other objects and advantages of the invention will appear in the course of the following description given by way of example, with reference to the accompanying drawings in which:

Fig. 1 is a longitudinal section of a tension measuring device according to the invention, applicable in connection with a reinforcement cable consisting of an even number of strands or wires;

Fig. 2 is a cross-section taken on line II—II of Fig. 1;

Fig. 3 is a perspective view of an element;

Figure 4 illustrates diagrammatically the operation of a tension measuring device according to the invention.

As shown in Figures 1 and 2, 1 indicates a vibrating cord or string of magnetic material, which may be set in vibration by means of electro-magnets 2a and 2b which may also serve to pick up the desired reading; the exciting and pick-up functions may be common to both electro-magnets, or alternatively one magnet may serve as the exciter and the other as the pick-up element. The electro-magnets are connected to the remote testing station by the electric leads 3 within the structure and the external cable 4.

The cord is retained at both ends by wedge-shaped clamping jaws 5 and 6 secured by screws 7 and 8 within end plugs 9 and 10. The end plugs are inserted into the ends of a tube 11 which constitutes the sensitive unit of the device.

The tube 11 in its intermediate portion between the ends thereof is thin-walled, in order to improve the sensitivity thereof as far as consistent with the elasticity of the metal. The end portions of the tube are provided with thick walls for properly maintaining the taper parts 9 and 10 in position and providing shoulders 12 and 13. The end openings of the device are tightly sealed with screw plug members 14 and 15 one of which is formed with a passage for the outer electric cable 14.

Distortable resilient members are provided in the form of angle-shaped parts 16 having an accurately predetermined apical angle. The ends of the arms terminate in knife-edge fulcra 17 and 18 adapted to rest in the grooves 12a and 13a formed in the shoulders 12 and 13. While the specific arrangement may depart from that shown, the angle-shaped members are so dimensioned and disposed as to bear by their end fulcra only against the shoulders 12 and 13 of the tube member.

Depending on the degree of sensitivity desired, the angle-shaped members may be provided with a uniform or a gradually variable thickness along their length, although their general shape must, of course, remain symmetrical. The pivot point at their apex may, if desired, be provided by a local reduction in their cross-section at that point; however, if cut-outs are formed in the apical region for this purpose, the cut-outs should be located in the reentrant angle of the apex in order to prevent a possible disturbance of the degree of flexibility of the members in service owing to the presence of the stressing wires 21 being tested, which wires bear against the external surfaces of the apices.

As shown in Fig. 2, there are as many opposite pairs of angle-shaped members 16 as there are pairs of wires 21 to be tested. These members are regularly distributed about the axis of the tube 11 and are identically dimensioned and arranged relatively to said tube, it being assumed that the wires 21 are all equally stressed. It should be noted however that there may be provided an odd number of wires and hence an odd number of angle-shaped members, provided the wires are regularly distributed.

Preferably, the angle-shaped members are joined to each other at their ends, their assembling forming a pair of barrel shaped shell elements, as illustrated in Fig. 3. The fulcra 17 and 18 will thus be distributed over two semi-circumferences and the several staves will be integrally bonded together owing to the solid semi-annuli $17a$ and $18a$.

On assembly, the central tube member 11 is first expanded by heat, and the two shells or semi-barrels are forced in between the shoulders 12 and 13 so as to insert the knife-edge fulcra 17 and 18 into the grooves $12a$ and $13a$. Moreover, spacer elements are inserted between the adjacent end faces of the semi-annular parts $17a$ and $18a$ in order to prevent the shells from bearing against the generatrices of the tube 11. Finally, after the above assembling operations have been completed, sufficient pressure is exerted upon the knuckle-joints of the angle-shaped members in order to impart to the branches thereof some amount of permanent deformation towards an increase in the angle they form. As a result, the pressure on the fulcra will deform the latter in engagement with the grooves $12a$ and $13a$ and cause them to bear in a uniform manner against the walls of the grooves.

With the structure thus firmly assembled, the set of angle-shaped members are ensured of being maintained in position both during handling of the device on the worksite and in the positioning thereof in relation to the wires to be tested.

The arrangement of the system in a reinforcing cable consisting of the two wires $21_1$ and $21_2$ extending through a passage 25 formed in a concrete part to be pre-stressed, is diagrammatically illustrated in Fig. 4.

The wires $21_1$ and $21_2$ engage with the apices of the angle-shaped members $16_1$ and $16_2$. The wires are forced apart by the insertion of the device while being maintained at their normal spacing elsewhere by rings 23 and 24 some distance away from the device.

The tension force F exerted on the opposite ends of each wire can be decomposed into a slightly larger force $F_1$ applied along the wire and into an inwardly directed force $F_2$ normal to the axis of the device through the apex of the related angle-shaped member. The transverse forces $F_2$ are converted by the members into forces $F_3$ which in turn may be split into longitudinal tension forces $F_4$ exerted upon the tube and the transverse reaction forces $F_5$ neutralized by the rigidity of the enlarged end portions of the tube. The traction force is proportional to the strain on the wires, a corrective term being introduced if desired to make allowance for the stiffness of the wires as a result of which a curvature will appear at the angles. Therefore it is seen that the desired tension measurement will be obtained by measuring the elastic elongation of the tube, as indicated by the vibrating frequency of the axial cord.

The device is designed to remain imbedded in the concrete as a permanent fixture and for this purpose it is preferably made gas-tight.

Moreover, in order to make the tension of the cord 1 independent of any transverse deformation of the end parts of tube 11, the ends of the cord 1 may be fastened into said parts by means of a suitable pivot or swivel joint. For this purpose, annular grooves such as shown at 26 in dotted lines in Fig. 1 both outside and inside of the thickened end portions of the tube may be used in order to reduce the cross sectional area of the end portions locally.

What we claim is:

1. A device for measuring the average tension of flexible, parallelly extending, tensioned wires, comprising a support disposed between said wires and spaced therefrom, said support having an elastically stretchable portion extending generally parallel to said wires, distortable stretching means engaging said portion through the ends thereof and bearing against said wires for deflecting same laterally away from each other, whereby said stretching means is distorted and said portion stretched by an amount which depends on the tension of said wires, and stretch measuring means associated with said support for measuring the stretch of said portion.

2. Device as recited in claim 1, wherein the stretch measuring means comprises a vibratable cord carried by said support and extending generally parallel to said portion, the ends of said cord being securely connected with the ends of said portion, whereby any amount of stretch produced in said portion gives rise to a substantially equal amount of stretch in said cord, means for vibrating said cord, and means for indicating the vibration frequency thereof.

3. Device as recited in claim 2, wherein said cord is made of magnetic material and said vibrating means and frequency indicating means are both electromagnetically-operating means.

4. Device as recited in claim 2, wherein said support and stretchable portion thereof are tubular and said cord extends along a general axial direction therein.

5. Device as recited in claim 4, further comprising end plugs on said tubular support for sealing same, whereby said cord is insulated from the medium surrounding said support.

6. Device as recited in claim 1, wherein said distortable stretching means comprises resilient angle-shaped members flexible about their apices and having hinge-forming ends, said members engaging said stretchable portion through said ends and bearing against said wires through said apices.

7. Device as recited in claim 6, wherein said angle-shaped members are regularly distributed about said support.

8. Device as recited in claim 7, wherein said portion is of generally cylindrical shape and said angle-shaped members are located next to each other in barrel formation around said portion.

9. Device as recited in claim 8, wherein said members are integral with each other through their ends and spaced from each other between their ends.

10. Device as recited in claim 8, wherein said members are juxtaposed and inter-connected to form two semi-tubular shells surrounding said portion.

References Cited in the file of this patent

UNITED STATES PATENTS

| | | |
|---|---|---|
| 2,040,874 | Pack | May 19, 1936 |
| 2,189,552 | Raphael | Feb. 6, 1940 |
| 2,265,786 | White | Dec. 9, 1941 |
| 2,362,626 | Giffen | Nov. 14, 1944 |